United States Patent [19]

Gruffaz et al.

[11] 4,046,835
[45] Sept. 6, 1977

[54] POLYMERS WITH IMIDE GROUPS, AND COMPRISING A POLYESTER FREE FROM ALIPHATIC UNSATURATION

[75] Inventors: Max Gruffaz, La Mulatiere; Jean-Louis Locatelli, Vienne, both of France

[73] Assignee: Rhone-Poulenc Industries, Paris, France

[21] Appl. No.: 663,346

[22] Filed: Mar. 3, 1976

[30] Foreign Application Priority Data

Mar. 10, 1975 France .......................... 75.07381

[51] Int. Cl.² .............................................. C08L 77/00
[52] U.S. Cl. .......................... 260/857 PA; 260/75 N; 260/78 UA; 260/857 PE
[58] Field of Search .................. 260/857 PA, 857 PE

[56] References Cited

U.S. PATENT DOCUMENTS

| 3,712,933 | 1/1973 | Docloux | 260/857 PA |
| 3,717,615 | 2/1973 | Holub | 260/857 PA |
| 3,763,273 | 10/1973 | Holub | 260/857 PA |
| 3,766,302 | 10/1973 | Holub | 260/857 PA |
| 3,970,714 | 7/1976 | Bargain | 260/857 PE |
| 3,972,960 | 8/1976 | Bargain | 260/857 PE |
| 3,998,787 | 12/1976 | Bargain | 260/857 PE |

*Primary Examiner*—Paul Lieberman
*Attorney, Agent, or Firm*—Stevens, Davis, Miller & Mosher

[57] ABSTRACT

A polymer is disclosed that results from the reaction of:
a. a polyimide of the formula:

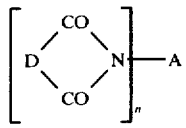

(I)

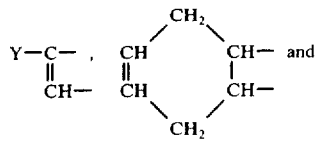

in which the symbol D represents a divalent radical selected from the class consisting of the radicals

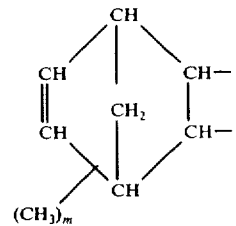

where Y represents H, CH₃ or Cl and m is 0 or 1, the symbol A represents an organic radical of valency n which may contain up to 30 carbon atoms, and n represents a number at least equal to 2;

b. a polyamine of the formula $$(NH_2)_pB \qquad (II)$$

in which the symbol B represents an organic radical of valency p which may contain up to 30 carbon atoms, and p represents a number at least equal to 2; and c. a linear polyester, free from aliphatic unsaturation, and of molecular weight at least equal to 1,500, the amounts of these reactants being such that there are 1.2 to 5 imide groups per NH₂ group, and the polyester represents up to 50% of the weight of the polyimide/polyamine/polyester combination. A process for making the polymer is also disclosed.

4 Claims, No Drawings

POLYMERS WITH IMIDE GROUPS, AND COMPRISING A POLYESTER FREE FROM ALIPHATIC UNSATURATION

The present invention relates to new polymers with imide groups.

These polymers are characterized in that they result from the reaction of:

a. a polyimide of the formula

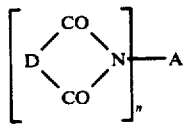
(I)

in which the symbol D represents a divalent radical selected from the class consisting of the radicals

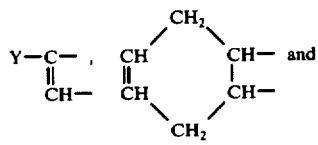

where Y represents H, CH$_3$ or Cl and $m$ is 0 or 1, the symbol A represents an organic radical of valency $n$ which may contain up to 30 carbon atoms, and $n$ represents a number at least equal to 2;

b. a polyamine of the formula (NH$_2$)$_p$B      (II)

in which the symbol B represents an organic radical of valency $p$ which may contain up to 30 carbon atoms, and $p$ represents a number at least equal to 2; and c. a linear polyester, free from aliphatic unsaturatation, and of molecular weight at least equal to 1,500.

The amounts of these three reactants are such that there are 1.2 to 5 imide groups per NH$_2$ group, and the polyester represents up to 50% of the weight of the polyimide/polyamine/polyester combination.

The symbol A may very desirably represent a divalent radical selected from the class consisting of phenylene and cyclohexylene radicals and radicals of the formula

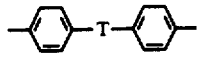

in which the symbol T represents a valency bond or a group or atom such as —CH$_2$—, —C(CH$_3$)$_2$—, —O— and —SO$_2$—.

The symbol A may also represent a radical possessing more than 2 free valencies, and preferably from 3 to 5 free valencies. Such a radical may in particular consist of a chain of several benzene rings carrying the said free valencies, and linked by divalent hydrocarbon groups having from 1 to 8 carbon atoms.

By way of illustration of suitable polyimides of the formula (I), there may be especially mentioned N,N',4,4'-diphenylmethane-bis-maleimide; N,N',4,4'-diphenyl-ether-bis-maleimide; N,N',4,4'-diphenylsulphone-bis-maleimide; N,N',4,4'-(2",2"-diphenylpropane)-bis-maleimide; N,N'-para-phenylene-bis-maleimide; N,N'-meta-phenylene-bis-maleimide; N,N',4,4'-diphenylmethane-bis-chloromaleimide; N,N',4,4'-diphenylmethane-bis-tetrahydrophthalimide; N,N',4,4'-diphenyl-ether-bis-endomethylene-tetrahydrophthalimide; and oligomers, with imide groups, of the formula

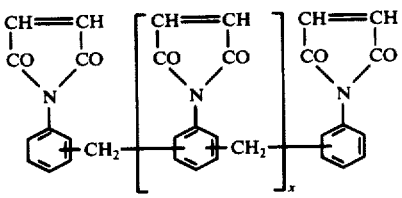

in which $x$ is between approximately 0.1 and 2.5.

The preparation of polyimides of the formula (I) is described, in particular, in U.S. Pat. No. 3,018,290, British Pat. No. 1,137,592, and French Pat. No. 2,142,740.

In formula (II), the symbol B may represent a divalent radical or a radical of a still higher valency, preferably between 3 and 5, which may be selected from the class consisting of radicals mentioned above in relation to the definition of the symbol A.

The following may be mentioned especially by way of illustration of polyamines of the formula (II): para-phenylenediamine; meta-phenylenediamine; bis-(4-amino-phenyl)-methane; bis-(4-aminophenyl) ether; bis-(4-amino-phenyl)-sulphone; and oligomeric polyamines of the formula:

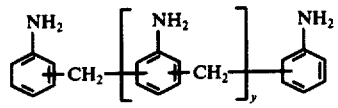

where $y$ is between approximately 0.1 and 2.5.

The preparation of such oligomeric polyamines is described especially in French Pat. No. 1,430,977; 1,481,935 and 1,533,696.

It is to be understood, both as regards the polyimide and as regards the polyamine, that it is possible to employ mixtures which comprise several polyimides or polyamines of the same functionality or of different functionality, with the values for the symbols $n$ and $p$ corresponding to mean values thereof.

The linear polyester component (c), which preferably represents at least 5% of the weight of the polyimide/polyamine/polyester mixture, may be selected from the class consisting of numerous polymers of this type which per se are well known and fully described in the literature.

The preparation of such linear polyesters may involve the use of aliphatic or aromatic reactants; these polyesters may desirably be derived from one or more acids or esters selected from the class consisting of adipic, succinic, oxalic, sebacic, cyclohexane-1,4-dicarboxylic, isophthalic and terephthalic acid; the naphthalenedicarboxylic acids, especially naphthalene-2,6-dicarboxylic acid; 4,4'dibenzoic acid; and bis-(4-carboxyphenyl)-sulphone.

The hydroxylic reactant from which these polyesters are derived may desirably be selected from the class consisting of 1,2-ethanediol; 1,2- and 1,3-propanediol; 1,2-, 2,3-, 1,3-, and 1,4-butanediol; 1,5-pentanediol; 2,2-dimethyl-1,3-propanediol; 1,6-hexanediol; 1,4-cyclohexanediol; 1,4-bis-hydroxymethyl-cyclohexane; and α,ω-dihydroxylic polyethers, such as polyoxyalkylene glycols, for example polyoxyethylene glycols, polyoxypropylene glycols, copolymers with polyoxyethylene and polyoxypropylene blocks, polyoxytetramethylene glycols derived from tetrahydrofurane, or polyoxybutylene glycols obtained from 1,2-epoxybutane and/or 1,3-epoxybutane.

In practicing this invention, preferred polyesters are those of which the molecular weight is between about 2,000 and about 30,000 and which are derived from at least one of the acids selected from the class consisting of adipic acid, sebacic acid, isophthalic acid and terephthalic acid.

The polymers according to this invention are prepared by heating the reactants to a temperature which is generally between 50° and 350° C. For reasons of practicality it is advantageous to carry out the reaction in two stages, that is to say first to prepare a prepolymer [P], having a softening point which is generally between 50° and 200° C, by heating to a moderate temperature and/or for a short time (for example for a few minutes at between 50° and 190°-200° C) and then, if desired, after molding, to cure this prepolymer by heating same to a temperature which can be as high as 350° C and is preferably between 180° and 280° C, if desired under a pressure which can be as high as 300 to 400 bars.

For the preparation of polymers according to this invention, it is desirable (first) to produce a physical mixture of the ingredients. This may consist in applying the usual techniques for mixing finely divided solids, or it may consist in preparing a solution or suspension of one part of the ingredients in the other part, maintained in the liquid state, if desired in a solvent medium. In general, if a polyester of a not very high melting point (such as of the order of 50° to 180° C) is used, it is possible to mix the three reactants directly, and this mixture is then heated until a liquid mass is obtained, which can then be readily homogenized by stirring. When dealing with polyesters of relatively high melted point (which may for example be as much as 250° C or more), it is preferable in a first stage to dissolve the polyester in the polyamine, which is kept in the molten state, and then to incorporate the bis- or polyimide into the mixture. It is also possible to introduce the polyester into a mixture consisting of the molten polyimide and the molten polyamine.

The polymers according to this invention may be used for the production of molded articles, especially by casting or by compression molding, such articles having good mechanical properties and remarkable resistance to heat exposures of very long duration (several thousands of hours).

The polymers of this invention may advantageously be combined with the usual additives (for example fibrous or pulverulent fillers), and/or they may be used for the production of laminates, employing woven or non-woven reinforcing materials based on fibers of mineral origin or based on synthetic fibers.

The examples which follow will still further serve to illustrate the invention:

EXAMPLE 1

6.5 g of polyester [$P_1$] are dissolved with stirring in 14.4 g of bis-(4-aminophenyl)-methane kept at 170° C.

65 g of N,N',4,4'-diphenylmethane-bis-maleimide are then introduced into the mixture, while maintaining the temperature at 170° C.

The whole is kept at 170° C for 10 minutes and the mixture is then poured into a mold of size 125 × 75 × 6 mm which is preheated to 200° C.

The whole is left at 200° C for 2 hours and then, after release from the mold, the article is reheated for 48 hours at 250° C in an oven.

Samples of size 30 × 7.5 × 6 mm are cut from the resulting bar and the flexural breaking strength is measured on these samples after ageing at 250° C, the appearance of cracks being noted.

The polyester [$P_1$] is a poly(1,4-butanediol terephthalate) of molecular weight about 20,000.

The results are collected in the table below which follows Examples 2 to 5.

EXAMPLES 2 to 5

Each of polyesters $P_2$ through $P_5$, 65 g of N,N',4,4'-diphenylmethane-bis-maleimide, and 14.4 g of bis-(4-amino-phenyl)-methane are mixed dry, the whole is then placed in a reactor preheated to 170° C, and this temperature is maintained until the mixture of reactants has completely melted.

The mixture is then molded by casting under the conditions described above in Example 1 and a heat ageing test is again carried out. The results are given in the table below.

The following polyesters are used:

$P_2$ — a polyadipate of ethylene glycol and propylene glycol (66 mols of ethylene glycol per 34 mols of propylene glycol) of molecular weight about 4,000: 8.8 g are used;

$P_3$ — poly(ethylene glycol sebacate) of molecular weight about 2,000: 9 g are used;

$P_4$ — a polyester derived from terephthalic acid, isophthalic acid, adipic acid and 1,4-butanediol, with a molar ratio of aromatic acids/aliphatic acids of 4.4, and a molar ratio of terephthalic acid/isophthalic acid of 3. The molecular weight of this polyester is about 8,000: 9g of polyester $P_4$ are used.

$P_5$ — a polyester derived from isophthalic acid and terephthalic acid (molar ratio 50/50) and from 2,2-dimethyl-1,3-propanediol and ethylene glycol (molar ratio 60/40), of molecular weight about 10,000: 79.4 g are used.

TABLE OF RESULTS

| Polyester | Flexural breaking strength, measured at 25° C after ageing at 250° C: (in kg/mm²) | | | | | | | Cracking at |
|---|---|---|---|---|---|---|---|---|
| | 0 (initial) | 1000 hrs | 2000 hrs | 3000 hrs | 5000 hrs | 7000 hrs | 9000 hrs | |
| $P_1$ | 15.8 | 17.5 | 15.5 | 11.70 | 8.35 | 7.7 | 3.3 | 9000 hrs |
| $P_2$ | 12.2 | 13.3 | 12.8 | 10.2 | 4.4 | | | 6000 hrs |
| $P_3$ | 9.4 | 6.5 | | 4.8 | 4.5 | | | 5000 hrs |

TABLE OF RESULTS-continued

| Polyester | Flexural breaking strength, measured at 25° C after ageing at 250° C: (in kg/mm²) | | | | | | | Cracking at |
|---|---|---|---|---|---|---|---|---|
| | 0 (initial) | 1000 hrs | 2000 hrs | 3000 hrs | 5000 hrs | 7000 hrs | 9000 hrs | |
| $P_4$ | 10 | 6.3 | 6.9 | 7.1 | 3.4 | 3.3 | | 7000 hrs |
| $P_5$ | 11.1 | | 8.4 | 6.4 | | | | 6000 hrs |

What is claimed is:

1. A polymer resulting from the reaction of:

a. a polyimide of the formula

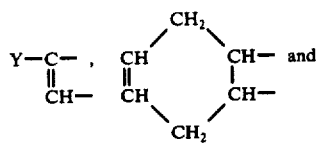 (I)

in which the symbol D represents a divalent radical selected from the class consisting of the radicals

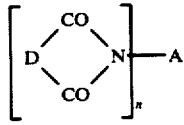

and

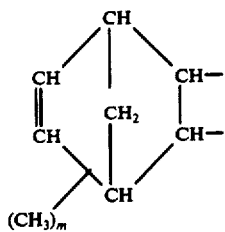

where Y represents H, CH₃ or Cl and $m$ is 0 or 1, the symbol A represents an organic radical of valency $n$ which may contain up to 30 carbon atoms, and $n$ represents a number at least equal to 2;

b. a polyamine of the formula $(NH_2)_p B$      (II)

in which the symbol B represents an organic radical of valency $p$ which may contain up to 30 carbon atoms, and $p$ represents a number at least equal to 2; and c. a linear polyester, free from aliphatic unsaturation, and of molecular weight at least equal to 1,500, the amounts of these reactants being such that there are 1.2 to 5 imide groups per NH₂ group, and the polyester represents at least 5% and up to 50% of the weight of the polyimide/polyamine/polyester combination.

2. A polymer according to claim 1, wherein the linear polyester has a molecular weight of between 2,000 and 30,000 and is derived from one or more acids selected from the class consisting of adipic acid, sebacic acid, isophthalic acid and terephthalic acid.

3. A process for the preparation of a polymer according to claim 1, consisting essentially in heating the mixture of reactants comprising the polyimide, the polyamine and the linear polyester at between 50° and 350° C.

4. A polymer according to claim 1, when in the form of a shaped article.

* * * * *